(12) United States Patent
Morimoto

(10) Patent No.: US 9,401,865 B2
(45) Date of Patent: Jul. 26, 2016

(54) NETWORK APPLIANCE REDUNDANCY SYSTEM, CONTROL APPARATUS, NETWORK APPLIANCE REDUNDANCY METHOD AND PROGRAM

(71) Applicant: Masaharu Morimoto, Tokyo (JP)

(72) Inventor: Masaharu Morimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 14/389,337

(22) PCT Filed: Mar. 29, 2013

(86) PCT No.: PCT/JP2013/059605
§ 371 (c)(1),
(2) Date: Sep. 29, 2014

(87) PCT Pub. No.: WO2013/147193
PCT Pub. Date: Oct. 3, 2013

(65) Prior Publication Data
US 2015/0055656 A1 Feb. 26, 2015

(30) Foreign Application Priority Data
Mar. 30, 2012 (JP) ................................ 2012-079953

(51) Int. Cl.
*H04L 12/26* (2006.01)
*H04L 12/28* (2006.01)
(Continued)

(52) U.S. Cl.
CPC ............... *H04L 45/74* (2013.01); *H04L 12/403* (2013.01); *H04L 12/4641* (2013.01);
(Continued)

(58) Field of Classification Search
CPC ... H04L 12/403; H04L 12/4641; H04L 45/28; H04L 45/72; H04L 45/74; H04L 47/125; H04L 49/30; H04L 49/552; H04L 61/103; H04L 69/40

USPC ................. 370/216–228, 241–252, 254–258, 370/310–350, 392, 400–402, 412–430, 370/474–476; 709/201–203, 223–226, 709/238–245
See application file for complete search history.

(56) References Cited

U.S. PATENT DOCUMENTS 7,227,872 B1    6/2007  Biswas et al.
7,406,037 B2 *  7/2008  Okita ..................... H04L 45/586
                                                          370/218

(Continued)

FOREIGN PATENT DOCUMENTS

JP    2005-303501 A    10/2005
JP    2007-208502 A     8/2007
(Continued)

OTHER PUBLICATIONS

European Search Report dated Nov. 10, 2015.
(Continued)

*Primary Examiner* — Tri H Phan
(74) *Attorney, Agent, or Firm* — Sughrue Mion, PLLC

(57) ABSTRACT

A network appliance redundancy system includes: a first switch arranged upstream of two different models of network appliances each of which switchably operates in an active system and a standby system; a second switch arranged downstream of the two different models of network appliances; and a control apparatus comprising a translation rule management unit learning a header translation rule(s) of a network appliance operating in the active system on the basis of header information of a packet transmitted from the first switch and header information of a packet received by the second switch via the network appliance operating in the active system and instructing, when the appliances in the active and standby systems are switched, the second switch to rewrite header information on the basis of the header translation rule(s) so as to obtain the same output packet as that from the network appliance operating in the active system.

17 Claims, 18 Drawing Sheets

(51) Int. Cl.

| | | |
|---|---|---|
| G06F 15/18 | (2006.01) | |
| H04L 12/741 | (2013.01) | |
| H04L 12/46 | (2006.01) | |
| H04L 29/14 | (2006.01) | |
| H04L 29/403 | (2006.01) | |
| H04L 12/803 | (2013.01) | |
| H04L 12/939 | (2013.01) | |
| H04L 12/935 | (2013.01) | |
| H04L 12/721 | (2013.01) | |
| H04L 29/12 | (2006.01) | |
| H04L 12/703 | (2013.01) | |

(52) U.S. Cl.
CPC ............. *H04L 47/125* (2013.01); *H04L 49/30* (2013.01); *H04L 49/552* (2013.01); *H04L 69/40* (2013.01); *H04L 45/28* (2013.01); *H04L 45/72* (2013.01); *H04L 61/103* (2013.01)

(56) References Cited

U.S. PATENT DOCUMENTS

| | | | | |
|---|---|---|---|---|
| 8,780,836 | B2 * | 7/2014 | Morimoto | H04L 47/125 370/329 |
| 9,083,612 | B2 * | 7/2015 | Hama | H04L 12/4633 |
| 2005/0226144 | A1 | 10/2005 | Okita | |
| 2006/0031407 | A1 * | 2/2006 | Dispensa | H04L 29/12009 709/219 |
| 2011/0295991 | A1 | 12/2011 | Aida | |

FOREIGN PATENT DOCUMENTS

| | | |
|---|---|---|
| JP | 2010-114585 | 5/2010 |
| JP | 2010-278584 A | 12/2010 |
| WO | WO 2011/083668 A1 | 7/2011 |
| WO | WO 2011/093288 A1 | 8/2011 |

OTHER PUBLICATIONS

Guilherme Piegas Koslovski: "Dynamically provisioned pirtual infrasructures: specification, allocation, and execution",Thesis, Jun. 24, 2011, pp. 1-168, XP055209999, HAL archives-ouvertes.fr. Retrieved from the Internet: URL: http://tel.archives-ouvertes.fr/tel-00661619/document [retrieved on Aug. 27, 2015].

Brendan Cully et al: "Remus: High Availability via Asynchronous Virtual Machine Replication", Proceedings of the 5th USENIX Symposium on Networked Systems Design and Implementation, Apr. 16, 2008, pp. 161-174, XP055018714, San Francisco, California. Retrieved from the Internet: URL: http://www.usenix.org/event/nsdi08/tech/full_papers/cully/cully.pdf [Retrieved on Feb. 8, 2012].

Xu Huawei M Boucadair France Telecom X: "Redundancy and Load Balancing Framework for Stateful Network Address Translators (NAT); draft-xu-behave-stateful-nat-standby-01.txt", Redundancy and Load Balancing Framework for Stateful Network Address Translators (NAT); draft-xu-behave-stateful-nat-standby-01.txt, Internet Engineering Task Force, IETF; Standardworkdraft, Internet Society (ISOC) 4, Rue Des Falaises CH-1205 GEN, No. 1, Sep. 25, 2009, XP015064305, [Retrieved on Sep. 25, 2009].

Japanese Office Action dated Sep. 1, 2015 with a partial English Translation.

Mark Reitblatt, et al., "Consistent Updates for Software-Defined Networks: Change You Can Believe In!", in Proc. ACM SIGCOMM HotNets Workshop, Nov. 2011.

International Search Report (ISR) (PCT Form PCT/ISA/210), in PCT/JP2013/059605, dated May 14, 2013.

Shuichi Karino, et al., "Duplicate Redundancy and Packet Processing Method in Router Clusters (Internet and general)", IEICE (The Institute of Electronics, Information and Communication Engineers) Technical Report, IA, Internet architecture, 104(377), 21-26, Oct. 21, 2004.

Nick McKeown, and seven others, "OpenFlow: Enabling Innovation in Campus Networks," [online], [searched on Feb. 14, 2012], Internet <URL: http://www.openflow.org/documents/openflow-wp-latest.pdf>.

"OpenFlow Switch Specification" Version 1.1.0 Implemented (Wire Protocol 0x02) [online], [searched on Feb. 14, 2012], Internet <URL:http://www.openflow.org/documents/openflow-spec-v1.1.0.pdf>.

* cited by examiner

FIG. 3

| IF | MAC ADDRESS | IP ADDRESS |
|---|---|---|
| CL1 | MAC_CL1 | IP_CL1 |
| SV1 | MAC_SV1 | IP_SV1 |
| SV2 | MAC_SV2 | IP_SV2 |
| SV3 | MAC_SV3 | IP_SV3 |
| AP1_L | MAC_AP1_L | IP_AP1_L |
| AP1_R | MAC_AP1_R | IP_AP1_R |
| AP2_L | MAC_AP2_L | IP_AP2_L |
| AP2_R | MAC_AP2_R | IP_AP2_R |

FIG. 4

| CLID | UPSTREAM SWITCH | | | DOWNSTREAM SWITCH | | | ACTIVE SYSTEM | APPLIANCE TYPE | CONTINU-ATION FLAG | KEY FIELD |
|---|---|---|---|---|---|---|---|---|---|---|
| | SWID | PORT IN SYSTEM 1 | PORT IN SYSTEM 2 | SWID | PORT IN SYSTEM 1 | PORT IN SYSTEM 2 | | | | |
| 1 | sw1 | p1 | p2 | sw2 | p1 | p2 | SYSTEM 1 | Half-NAT | No | nw_src |

FIG. 5

| No. | CLID | ACTIVE SYSTEM | PRE-TRANSLATION HEADER INFORMATION | | POST-TRANSLATION HEADER INFORMATION IN SYSTEM 1 | | POST-TRANSLATION HEADER INFORMATION IN SYSTEM 2 | |
|---|---|---|---|---|---|---|---|---|
| | | | nw_src | nw_dst | nw_src | nw_dst | nw_src | nw_dst |
| 1 | 1 | SYSTEM 1 | IP_CL1 | VIP_L | IP_CL1 | IP_SV1 | IP_CL1 | IP_SV2 |

FIG. 6

| No. | match | | | | | action | | |
|---|---|---|---|---|---|---|---|---|
| | inport | dl_type | dl_dst | nw_src | nw_dst | | | |
| 103 | p1 | IP | * | VIP_L | IP_CL1 | output p0 | | |
| 102 | p0 | IP | * | IP_CL1 | VIP_L | ADD PRE-TRANSLATION HEADER | rewrite dl_dst=MAC_AP1_L | output p1 | rewrite dl_dst=MAC_AP2_L | output p2 |
| 101 | p1 | ARP | * | * | * | output p0 | | |
| 100 | p0 | ARP | * | * | * | output p1 | | |
| 1 | p2 | * | * | * | * | drop | | |
| 0 | * | * | * | * | * | output controller | | |

FIG. 7

| No. | match | | | | | action | | | |
|---|---|---|---|---|---|---|---|---|---|
| | inport | dl_type | dl_dst | nw_src | nw_dst | | | | |
| 104 | p0 | IP | * | IP_SV1 | IP_CL1 | rewrite dl_dst=MAC_AP1_R | output p1 | rewrite dl_dst=MAC_AP2_R dl_src=MAC_SV2 nw_src=IPC_SV2 | output p2 |
| 103 | p1 | ARP | * | * | * | output p0 | | | |
| 102 | p0 | ARP | * | * | * | output p1 | | | |
| 101 | p1 | IP | * | IP_CL1 | IP_SV1 | output p2 | | | |
| 100 | p2 | IP | * | IP_CL1 | IP_SV2 | DELETE PRE-TRANSLATION HEADER | output p0 | | |
| 1 | p2 | ARP | * | * | * | drop | | | |
| 0 | * | * | * | * | * | output controller | | | |

FIG. 16

| CLID | UPSTREAM SWITCH | | | DOWNSTREAM SWITCH | | | ACTIVE SYSTEM | APPLIANCE TYPE | CONTINU-ATION FLAG | KEY FIELD |
|---|---|---|---|---|---|---|---|---|---|---|
| | SWID | PORT IN SYSTEM 1 | PORT IN SYSTEM 2 | SWID | PORT IN SYSTEM 1 | PORT IN SYSTEM 2 | | | | |
| 1 | sw1 | p1 | p2 | sw2 | p1 | p2 | SYSTEM 2 | Half-NAT | No | nw_src |

FIG. 17

| No. | match | | | | | action |
|---|---|---|---|---|---|---|
| | inport | dl_type | dl_dst | nw_src | nw_dst | |
| 103 | p2 | IP | * | VIP_L | IP_CL1 | output p0 |
| 102 | p0 | IP | * | IP_CL1 | VIP_L | ADD PRE-TRANSLA-TION HEADER / rewrite dl_dst=MAC_AP1_L / output p1 / rewrite dl_dst=MAC_AP2_L / output p2 |
| 101 | p2 | ARP | * | * | * | output p0 |
| 100 | p0 | ARP | * | * | * | output p1 / output p2 |
| 1 | p1 | * | * | * | * | drop |
| 0 | * | * | * | * | * | output controller |

FIG. 18

| No. | \multicolumn{5}{c}{match} | \multicolumn{4}{c}{action} | | | |
|---|---|---|---|---|---|---|---|---|---|
| | inport | dl_type | dl_dst | nw_src | nw_dst | | | | |
| 104 | p0 | IP | * | IP_SV1 | IP_CL1 | rewrite dl_dst=MAC_AP1_R | output p1 | rewrite dl_dst=MAC_AP2_R dl_src=MAC_SV2 nw_src=IPC_SV2 | output p2 |
| 103 | p2 | ARP | * | * | * | output p0 | | | |
| 102 | p0 | ARP | * | * | * | output p1 | | | |
| 101 | p1 | IP | * | IP_CL1 | IP_SV1 | drop | | | |
| 100 | p2 | IP | * | IP_CL1 | IP_SV2 | DELETE PRE-TRANSLATION HEADER | rewrite dl_dst=MAC_SV1 nw_dst=IP_SV1 | | output p0 |
| 1 | p1 | ARP | * | * | * | drop | | | |
| 0 | * | * | * | * | * | output controller | | | |

NETWORK APPLIANCE REDUNDANCY SYSTEM, CONTROL APPARATUS, NETWORK APPLIANCE REDUNDANCY METHOD AND PROGRAM

REFERENCE TO RELATED APPLICATION

The present invention is based upon and claims the benefit of the priority of Japanese patent application No. 2012-079953 filed on Mar. 30, 2012, the disclosure of which is incorporated herein in its entirety by reference thereto.

TECHNICAL FIELD

The present invention relates to a network appliance redundancy system, a control apparatus, a network appliance redundancy method, and a program. In particular, it relates to a network appliance redundancy system in which two different models of network appliances are arranged, a control apparatus, a network appliance redundancy method, and a program.

BACKGROUND

PTL 1 discloses a configuration in which a master router and a backup router are arranged in parallel. According to PTL 1, a shared hub arranged upstream the parallel routers duplicates a packet and transmits the duplicated packets to the master router and the backup router, respectively. While the master router forwards the packet, the backup router drops the packet. In this way, a state can be synchronized without performing communication between the master and backup routers.

PTL 2 discloses a packet transfer apparatus that duplicates a packet therein. The duplicated packets are forwarded to path control modules in active and standby systems, respectively, in the packet transfer apparatus and these path control modules perform path control processing. The packet transfer apparatus determines a state of the standby module by receiving an internal control packet from the standby module.

NPL 1 proposes a method for reducing state exchange overhead by duplicating a packet and forming a redundant state.

NPLs 2 and 3 relate to a centralized-control-type network referred to as OpenFlow.

PATENT LITERATURE (PTL)

[PTL 1]
Japanese Patent Kokai Publication No. 2007-208502A
[PTL 2]
Japanese Patent Kokai Publication No. 2005-303501A

NON-PATENT LITERATURE (NPL)

[NPL 1]
KARINO Shuichi, SUZUKI Kazuya, JIBIKI Masahiro, "Duplicated Redundancy and Packet Processing Method in Router Clusters (Internet and general)", IEICE (The Institute of Electronics, Information and Communication Engineers) technical report, IA, Internet architecture, 104 (377), 21-26, 2004-10-21
[NPL 2]
Nick McKeown, and seven others, "OpenFlow: Enabling Innovation in Campus Networks," [online], [searched on Feb. 14, 2012], Internet <URL: http://www.openflow.org/documents/openflow-wp-latest.pdf>
[NPL 3]
"OpenFlow Switch Specification" Version 1.1.0 Implemented (Wire Protocol 0x02) [online], [searched on Feb. 14, 2012], Internet <URL:http://www.openflow.org/documents/openflow-spec-v1.1.0.pdf>

SUMMARY

The following analysis has been given by the present inventor. When a plurality of virtual networks share physical network resources, a malfunction in a single network affects a plurality of virtual networks. Normally, in preparation for such event, it is necessary to form a redundancy configuration by preparing two or more systems including an active system and a standby system for each network appliance.

However, when a redundancy configuration is formed for a network appliance (which will be simply referred to as an "appliance" or "AP") that performs packet header (which will be simply referred to as a "header") translation (which will be simply referred to as "header translation"), such as NAT (Network Address Translation), NAPT (Network Address Port Translation), and LB (Load Balancer), a stateful failover needs to be realized for a service(s). The "stateful failover" is a failover that allows an ongoing session to continue even if an active appliance (which will be referred to as an "ACT" and a standby appliance will be referred to as an "SBY") is switched (which will be referred to as switching systems) during the session. In such case, a user needs to prepare two or more appliances of the same model having a redundancy function and needs to closely connect these appliances. This is because, since each appliance has a different header translation result (hereinafter referred to as a "post-translation header"), translation information needs to be exchanged and shared between the ACT and the SBY. In addition, manufacturers or appliances have different methods for sharing the translation information. As a result, this restriction reduces the flexibility in network configuration and allocation of physical resources.

In this respect, according to techniques in PTLs 1 and 2 and NPL 1, routers need to be modified. Namely, these routers sold by venders cannot be used without modification, counted as a problem.

An object of the present invention is to provide a network appliance redundancy system, a control apparatus, a network appliance redundancy method, and a program that can contribute to realization of a stateful failover using two different models of network appliances.

According to a first aspect, there is provided a network appliance redundancy system including: a first switch arranged upstream of two different models of network appliances each of which switchably operates in an active system and a standby system; a second switch arranged downstream of the two different models of network appliances; and a control apparatus including a translation rule management unit learning a header translation rule(s) of a network appliance operating in the active system on the basis of header information of a packet transmitted from the first switch and header information of a packet received by the second switch via the network appliance operating in the active system and instructing, when the appliances in the active and standby systems are switched, the second switch to rewrite header information on the basis of the header translation rule(s) so as to obtain the same output packet as that from the network appliance operating in the active system.

According to a second aspect, there is provided a control apparatus: connected to a first switch arranged upstream of two different models of network appliances each of which switchably operates in an active system and a standby system and to a second switch arranged downstream of the two different models of network appliances; including a translation rule management unit learning a header translation rule(s) of a network appliance operating in the active system on the basis of header information of a packet transmitted from the first switch and header information of a packet received by the second switch via the network appliance operating in the active system; and instructing, when the appliances in the active and standby systems are switched, the second switch to rewrite header information on the basis of the header translation rule(s) so as to obtain the same output packet as that from the network appliance operating in the active system.

According to a third aspect, there is provided a network appliance redundancy method including: causing a control apparatus, connected to a first switch arranged upstream of two different models of network appliances each of which switchably operates in an active system and a standby system and to a second switch arranged downstream of the two different models of network appliances, to learn a header translation rule(s) of a network appliance operating in the active system on the basis of header information of a packet transmitted from the first switch and header information of a packet received by the second switch via the network appliance operating in the active system; and causing the control apparatus to instruct, when the appliances in the active and standby systems are switched, the second switch to rewrite header information similarly to the first switch on the basis of the header translation rule(s). This method is associated with a certain machine, namely, with the control apparatus controlling the switches.

According to a fourth aspect, there is provided a program, causing a computer, which is mounted on a control apparatus connected to a first switch arranged upstream of two different models of network appliances each of which switchably operates in an active system and a standby system and to a second switch arranged downstream of the two different models of network appliances, to perform processing for: learning a header translation rule(s) of a network appliance operating in the active system on the basis of header information of a packet transmitted from the first switch and header information of a packet received by the second switch via the network appliance operating in the active system; and instructing, when the appliances in the active and standby systems are switched, the second switch to rewrite header information similarly to the first switch on the basis of the header translation rule(s). This program can be recorded in a computer-readable (non-transient) storage medium. Namely, the present invention can be embodied as a computer program product.

The meritorious effects of the present invention are summarized as follows.

The present disclosure can contribute to realization of a stateful failover with a redundancy configuration using two different models of network appliances.

BRIEF DESCRIPTION OF DRAWINGS

FIG. 3 illustrates a correspondence table in which a MAC address and an IP address of each apparatus are associated with each other.

FIG. 4 illustrates a redundancy configuration management table stored in a control apparatus according to the first exemplary embodiment of the present disclosure.

FIG. 5 illustrates a header translation table stored in the control apparatus according to the first exemplary embodiment of the present disclosure.

FIG. 6 illustrates flow entries (control information) set in a first switch (an upstream switch) according to the first exemplary embodiment of the present disclosure.

FIG. 7 illustrates flow entries (control information) set in a second switch (a downstream switch) according to the first exemplary embodiment of the present disclosure.

FIG. 16 illustrates the redundancy configuration management table when an AP2 (system 2) operates in an active system.

FIG. 17 illustrates flow entries (control information) set in the first switch (the upstream switch) when the AP2 (system 2) operates in the active system.

FIG. 18 illustrates flow entries (control information) set in the second switch (the downstream switch) when the AP2 (system 2) operates in the active system.

PREFERRED MODES

Figure 1:
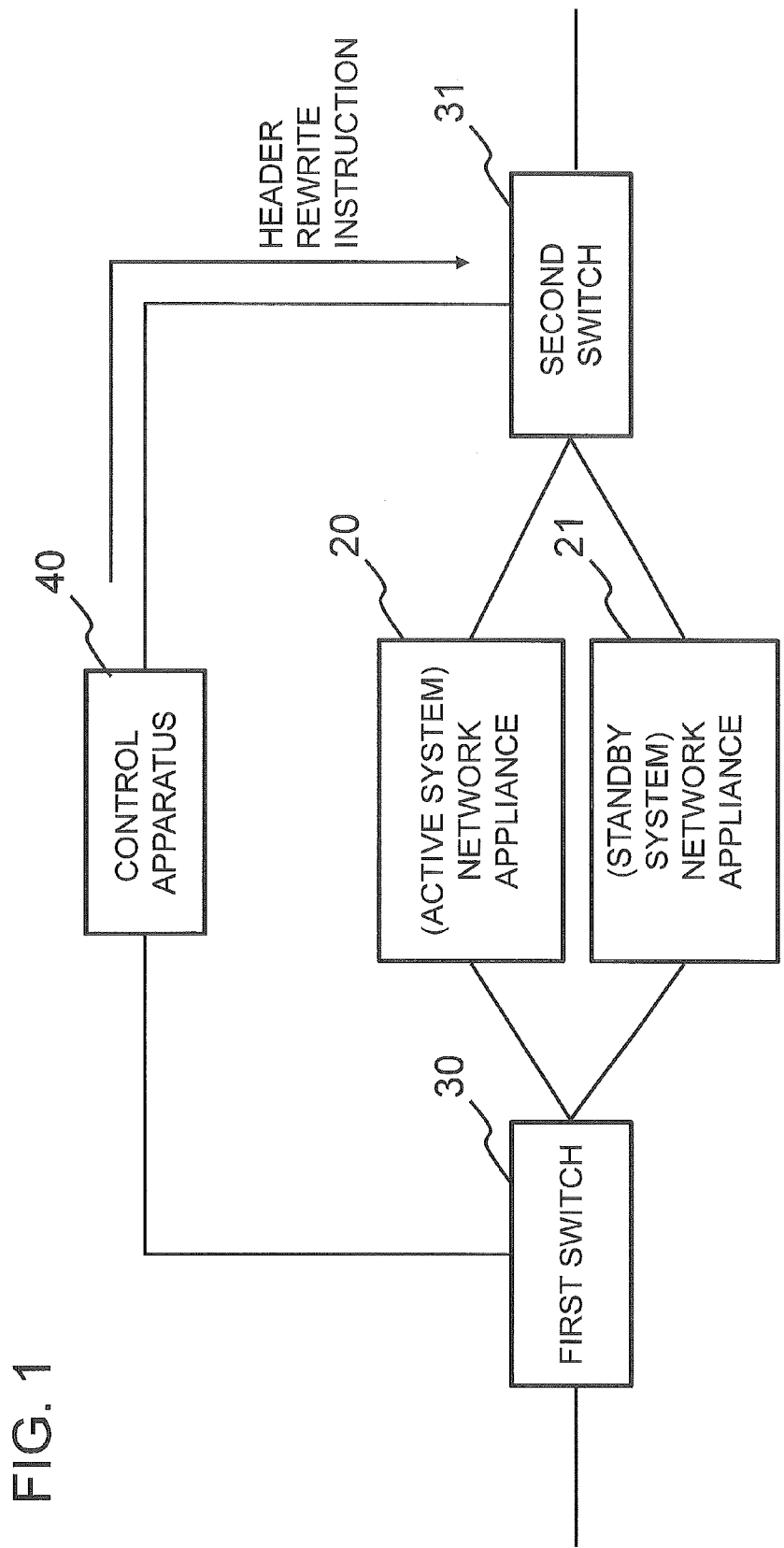
FIG. 1 illustrates a configuration according to an exemplary embodiment of the present disclosure.

First, an outline of an exemplary embodiment of the present disclosure will be described with reference to the drawings. In the following outline, various components are denoted by reference characters for the sake of convenience. Namely, the following reference characters are merely used as examples to facilitate understanding of the present disclosure, not to limit the present disclosure to the illustrated modes.

As illustrated in FIG. 1, an exemplary embodiment of the present disclosure can be realized by a configuration including a first switch 30 arranged upstream of two different models of network appliances 20 and 21 each of which switchably operates in an active system and a standby system, a second switch 31 arranged downstream of the two different models of network appliances 20 and 21, and a control apparatus 40 controlling the first switch 30 and the second switch 31.

More specifically, the control apparatus 40 includes a translation rule management unit learning a header translation rule(s) of the network appliance 20 operating in the active system on the basis of header information of a packet transmitted from the first switch 30 and header information of a packet received by the second switch 31 via the network appliance operating in the active system. In addition, when the network appliances 20 and 21 in the active and standby systems are switched, on the basis of the header translation rule(s), the control apparatus 40 instructs the second switch 31 to rewrite header information so as to obtain the same output packet as that from the network appliance 20 operating in the active system.

In this way, a stateful failover can be realized between different appliances. According to the above configuration, there is no need to modify the appliances. The manufacturers or models of the appliances 20 and 21 may be different, as long as the appliances 20 and 21 have the same type of header translation functions.

First Exemplary Embodiment

Next, a first exemplary embodiment of the present disclosure will be described in detail with reference to the drawings. In the following example, a redundancy configuration using load balancers (hereinafter referred to as "LBs") performing Half-NAT as appliances is formed. However, the present disclosure is not limited to this exemplary embodiment. Namely, the present disclosure is also applicable to when a redundancy configuration using other appliances performing other header translation is formed.

Figure 2:
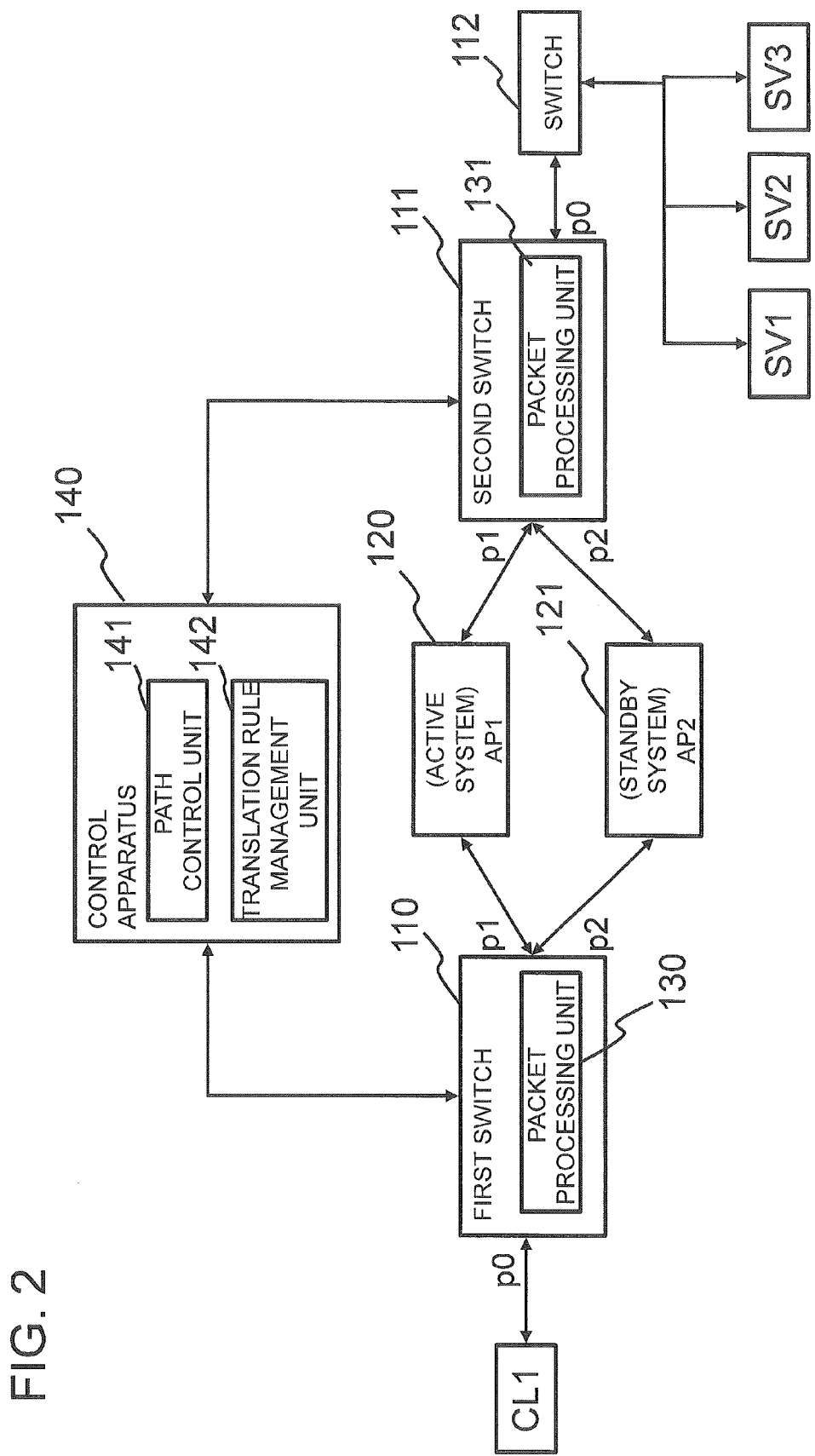
FIG. 2 illustrates a configuration of a network appliance redundancy system according to a first exemplary embodiment of the present disclosure.

FIG. 2 illustrates a configuration of a network appliance redundancy system according to the first exemplary embodiment of the present disclosure. As illustrated in FIG. 2, the configuration includes appliances (APs) 120 and 121 arranged in parallel, a first switch 110 arranged upstream of these APs 120 and 121, a second switch 111 arranged downstream of these APs 120 and 121, and a control apparatus 140 controlling the first switch 110 and the second switch 111.

A client CL1 is connected to a port p0 of the first switch 110. The appliance (AP) 120 operating in an active system in an initial state is connected to a port p1 of the first switch 110. The appliance (AP) 121 operating in a standby system in the initial state is connected to a port p2 of the first switch 110. Likewise, the appliance (AP) 120 operating in the active system in the initial state is connected to a port p1 of the second switch 111. The appliance (AP) 121 operating in the standby system in the initial state is connected to a port p2 of the second switch 111. In addition, servers SV1 to SV3 are connected to a port p0 of the second switch 111 via a switch 112. Each of the appliances (APs) 120 and 121 includes a NAT table (an address translation table).

The control apparatus 140 includes a path control unit 141 and a translation rule management unit 142. The path control unit 141 has functions of learning a relationship between at least one MAC (Media Access Control) address and at least one port, learning a relationship between at least one IP (Internet Protocol) address and at least one MAC address as illustrated in FIG. 3, and setting flow entries (control information) in the first and second switches.

The translation rule management unit 142 in the control apparatus 140 stores a redundancy configuration management table for managing a configuration and a state of appliances forming the redundant configuration and a header translation table for managing the content of header translation performed by each system in the redundant configuration per flow. When the appliance 121 is switched from the standby-system appliance to the active-system appliance, the translation rule management unit 142 in the control apparatus 140 refers to the header translation table and instructs the second switch 111 arranged downstream of these appliances to rewrite header information so as to obtain the same output packet as that from the appliance 120 operating in the active system.

FIG. 4 illustrates the redundancy configuration management table stored in the translation rule management unit 142. The redundancy configuration management table in FIG. 4 can store at least one cluster ID (hereinafter referred to as a "CLID") for determining an appliance included in the redundancy configuration. Each CLID is associated with: information about connection among appliances forming the redundancy configuration and switches (sw1 represents an ID of the first switch and sw2 represents an ID of the second switch); information about a system operating as an active system; information about an appliance type; a continuation flag indicating whether to continue processing of adding a pre-translation header even after header translation rules of both the ACT and SBY are set; and a key field for managing a field serving as a key necessary for determining that a certain packet train belongs to the same flow on the basis of the pre-translation header.

FIG. 5 illustrates the header translation table stored in the translation rule management unit 142. The header translation table in FIG. 5 can store pre-translation header information (namely, header information of a packet transmitted from the first switch 110 via the second switch 111) and post-translation header information translated by the respective appliances 120 and 121 (namely, header information of a packet received by the second switch 111) are associated with a CLID. In the following description including FIGS. 4 and 5, dl_type represents an upper-layer protocol type, dl_src represents a source MAC address, and dl_dst represents a destination MAC address. In addition, nw_src represents a source IP address and nw_dst represents a destination IP address. In addition, tp_src represents a source L4 port number and tp_dst represents a destination L4 port number.

The first and second switches 110 and 111 include packet processing units 130 and 131, respectively, that operate in accordance with flow entries (control information) set by the path control unit 141 in the control apparatus 140. In addition, each of the first and second switches 110 and 111 includes a control information storage unit (not illustrated) storing flow entries (control information).

FIG. 6 illustrates flow entries (control information) set in the first switch 110. In FIG. 6, a flow entry stored at a higher level (a flow entry having a larger value in the "No." field) is treated as a flow entry having a higher priority. In each of the flow entries (control information), matching conditions (match) for determining a flow and an action(s) performed on the flow are associated with each other. For example, flow entry No. 103 in FIG. 6 indicates that, when the first switch 110 receives an IP packet via the port p1, namely, from the appliance 120, the IP packet representing that the source IP address is VIP_L (a virtual IP address on the input side of the appliance) and the destination IP address is IP_CL1 (an IP address of the client CL1), the first switch 110 forwards the IP packet via the port p0, namely, to the client CL1. In FIG. 6, "*" represents a wildcard. For example, "*" is set as each matching condition in flow entry No. 0 in FIG. 6. Accordingly, when the first switch 110 receives a packet having header information that does not match any of the higher-level flow entries, the first switch 110 transmits the packet to the control apparatus 140. When the path control unit 141 in the control apparatus 140 receives the packet, the path control unit 141 analyzes the content of the packet, performs path calculation and the like, and sets an appropriate flow entry in the first switch 110 (also in the second switch 111, if necessary).

In addition, FIG. 6 includes a flow entry for rewriting, when the first switch 110 receives an IP packet via the port p0, namely, from the client CL1, the IP packet representing that the destination IP address is IP_CL1 (the IP address of the client CL1) and the source IP address is IP_SV1 (an IP address of the server SV1), the destination MAC address or the like and transmitting the packet via the ports p1 and p2 (see flow entry No. 102). In addition, FIG. 6 includes a flow entry for transmitting, when the first switch 110 receives an ARP (Address Resolution Protocol) packet from the client CL1, the ARP packet via each of the ports p1 and p2 (see flow entry No. 100).

FIG. 7 illustrates flow entries (control information) set in the second switch 111. For example, flow entry No. 104 in FIG. 7 indicates that, when the second switch 111 receives an IP packet via the port p0, namely, from the switch 112, the IP packet representing that the source IP address is VIP_L (the virtual IP address on the input side of the appliance) and that the destination IP address is IP_CL 1 (the IP address of the client CL1), the second switch 111 changes the destination MAC address in the header information to a corresponding MAC address of a connection port of each appliance and transmits the IP packet via each of the ports p1 and p2 (see flow entry No. 104; the source MAC address and the source IP address are also rewritten for the packet transmitted to the appliance 121). In addition, FIG. 7 includes a flow entry for deleting, when the second switch 111 receives a packet that includes a pre-translation header added by the first switch 110 as described above and that is forwarded via the appliance 120, the pre-translation header and forwarding the packet to the switch 112 (see flow entry No. 101). FIG. 7 also includes a flow entry for dropping, when the second switch 111 receives a packet that includes a pre-translation header added by the first switch 110 and that is forwarded via the appliance 121 operating in the standby system, the packet (see flow entry No. 100). In addition, as in FIG. 6, FIG. 7 includes a flow entry in which a wildcard "*" is set as each matching condition (see flow entry No. 0). Thus, when the second switch 111 receives a packet having header information that does not match any of the higher-level flow entries, the second switch 111 transmits the packet to the control apparatus 140.

Each of the packet processing units 130 and 131 can be implemented as a program that is operated by a CPU (Central Processing Unit) in each of the switches 110 and 111 or can be realized as an ASIC (Application Specific Integrated Circuit) performing specific processing. In addition, since the above basic operation is similar to that of an OpenFlow switch in NPLs 1 and 2, a switch configured in accordance with the specification in NPL 2 can also be used.

Figure 8:
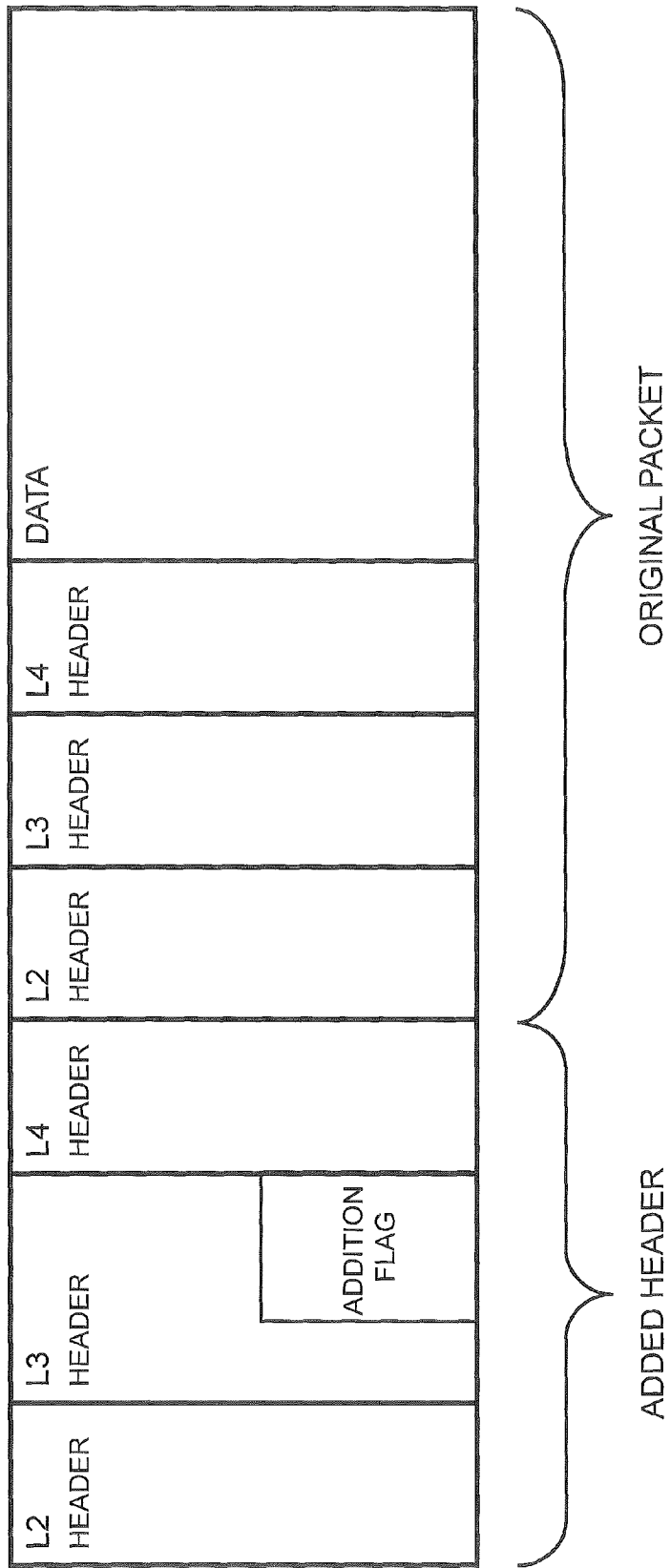
FIG. 8 illustrates packet translation (encapsulation) according to the first exemplary embodiment of the present disclosure.

Next, specific methods for adding (deleting) header information performed when header addition or deletion is set as an action in FIGS. 6 and 7 will be described. For example, the following methods can be used to add (delete) header information. In a first method, as illustrated in FIG. 8, packet header information is encapsulated in the same type of packet header information. In FIG. 8, in order to determine whether a pre-translation header is added to a packet, a flag for indicating addition of a pre-translation header is set in an IP header option field (Options).

Figure 9:
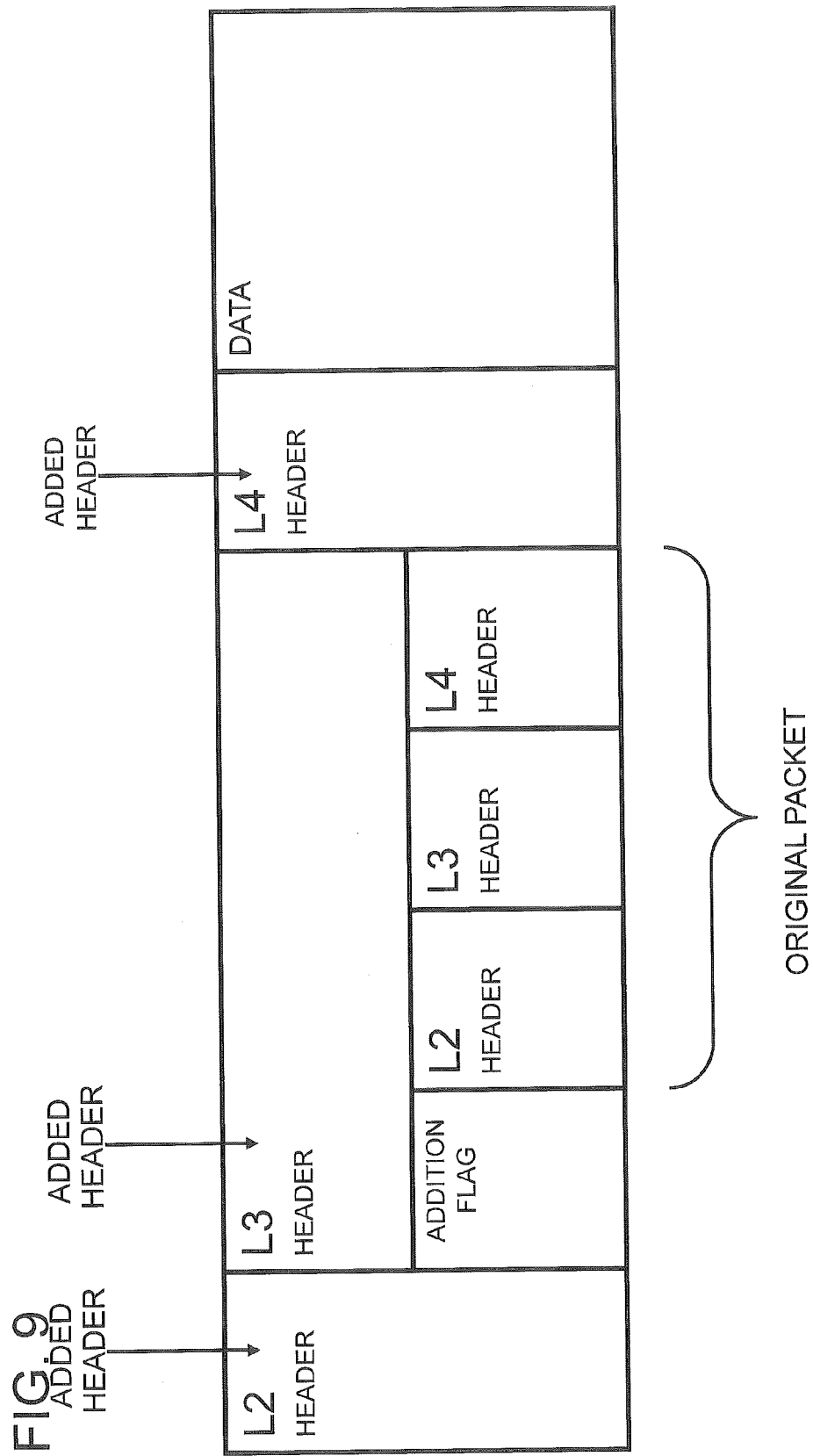
FIG. 9 illustrates another packet translation (header embedment) according to the first exemplary embodiment of the present disclosure.

In a second method, as illustrated in FIG. 9, headers are stored in IP header option fields (Options). In FIG. 9, an addition flag is also set for determining whether a pre-translation header is added. While the IP header option fields (Options) are used in FIGS. 8 and 9, TCP header option fields (Options) may be used. While L2 to L4 headers are stored in FIGS. 8 and 9, it is not necessary to store all the headers. Only the header fields that are necessary may be stored.

Next, operations according to the present exemplary embodiment will be described in detail with reference to the drawings.

[Initial Settings]

Figure 10:
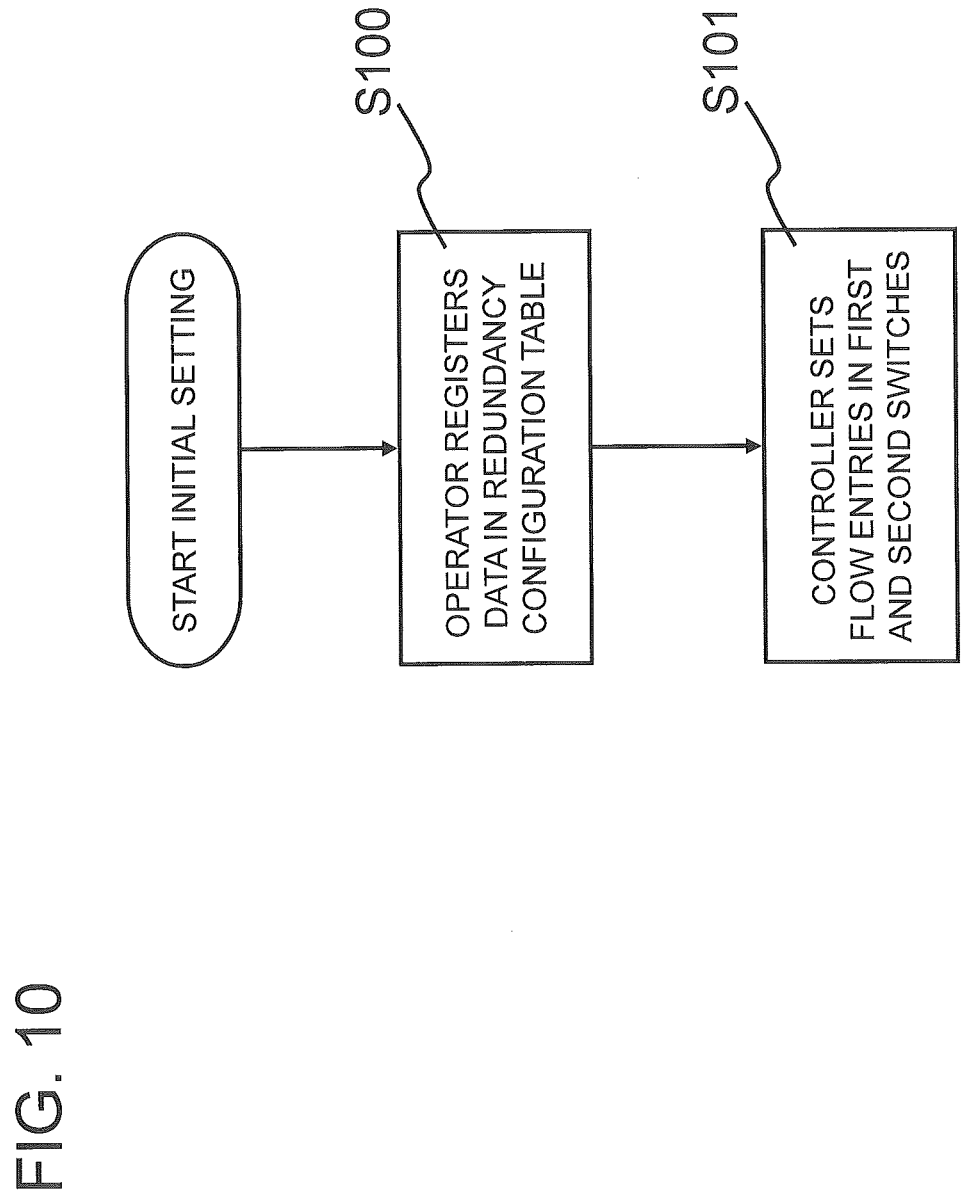
FIG. 10 is a flowchart illustrating an operation (initial setting) according to the first exemplary embodiment of the present disclosure.

First, initial settings that are made in the control apparatus 140, the first switch 110, and the second switch 111 illustrated in FIG. 2 will be described. FIG. 10 is a flowchart illustrating an operation (initial settings) according to the first exemplary embodiment of the present disclosure. In the following description, the first switch 110 will be referred to as an upstream switch and the second switch 111 will be referred to as a downstream switch.

As illustrated in FIG. 10, an operator registers a cluster ID (CLID), information about connection among the appliances forming the redundancy configuration and the upstream and downstream switches, information about a system operating as the active system, information about an appliance type, a continuation flag, and a key field in the redundancy configuration management table (step S100).

The continuation flag and the key field may be registered manually or automatically. For example, when the appliance type is Half-NAT (DNAT), the system may automatically determine that the continuation flag is No and the key field is nw_src. However, if, because of the packet header translation performed by an appliance, flow information cannot uniquely be determined by nodes arranged upstream and downstream of the appliance, the continuation flag needs to be set to Yes without fail. For example, when the appliance type is Full-NAT, instead of Half-NAT as in FIG. 4, since an appliance translates both the source and destination IP addresses, the flow cannot be determined by nodes arranged upstream and downstream of the appliance. In such case, by setting the continuation flag to Yes, the upstream switch (the first switch 110) continues adding pre-translation header information and the downstream switch (the second switch 111) continues deleting the pre-translation header information. As a result, the control apparatus can determine the flow. When the appliance type is Full-NAT, nw_src and nw_dst are added in the key field as conditions. When the appliance type is NAPT, tp_src and tp_dst are added in the key field as conditions.

Hereinafter, the present exemplary embodiment will be described assuming that the operator manually sets Yes as the continuation flag and nw_src as the key field. If the continuation flag is No, when post-translation header information of both the ACT and SBY is set in the header translation table, the control apparatus 140 instructs the packet processing unit 130 to stop adding a pre-translation header (namely, it is only necessary to instruct the packet processing unit 130 to delete flow entry No. 102 in FIG. 6). While adding a pre-translation header, the upstream switch (the first switch 110) maintains the above addition flag (see FIGS. 8 and 9) in an IP header to be ON. If the addition flag is ON, the downstream switch (the second switch 111) deletes the above pre-translation header information.

Next, when the entries are registered in the redundancy configuration management table, the control apparatus 140 sets flow entry No. 1 for dropping packets from the SBY in the flow table in the upstream switch (the first switch 110) on the basis of the acquired information. In addition, the control apparatus 140 sets flow entry No. 1 for dropping ARP packets from the SBY in the flow table in the downstream switch (the second switch 111). This example assumes that the flow entries No. 0 in the upstream and downstream switches are set when these switches are connected to the control apparatus.

Next, packet forwarding processing that can be performed after the above initial settings are completed will be described.

[Packet Forwarding]

Figure 11:
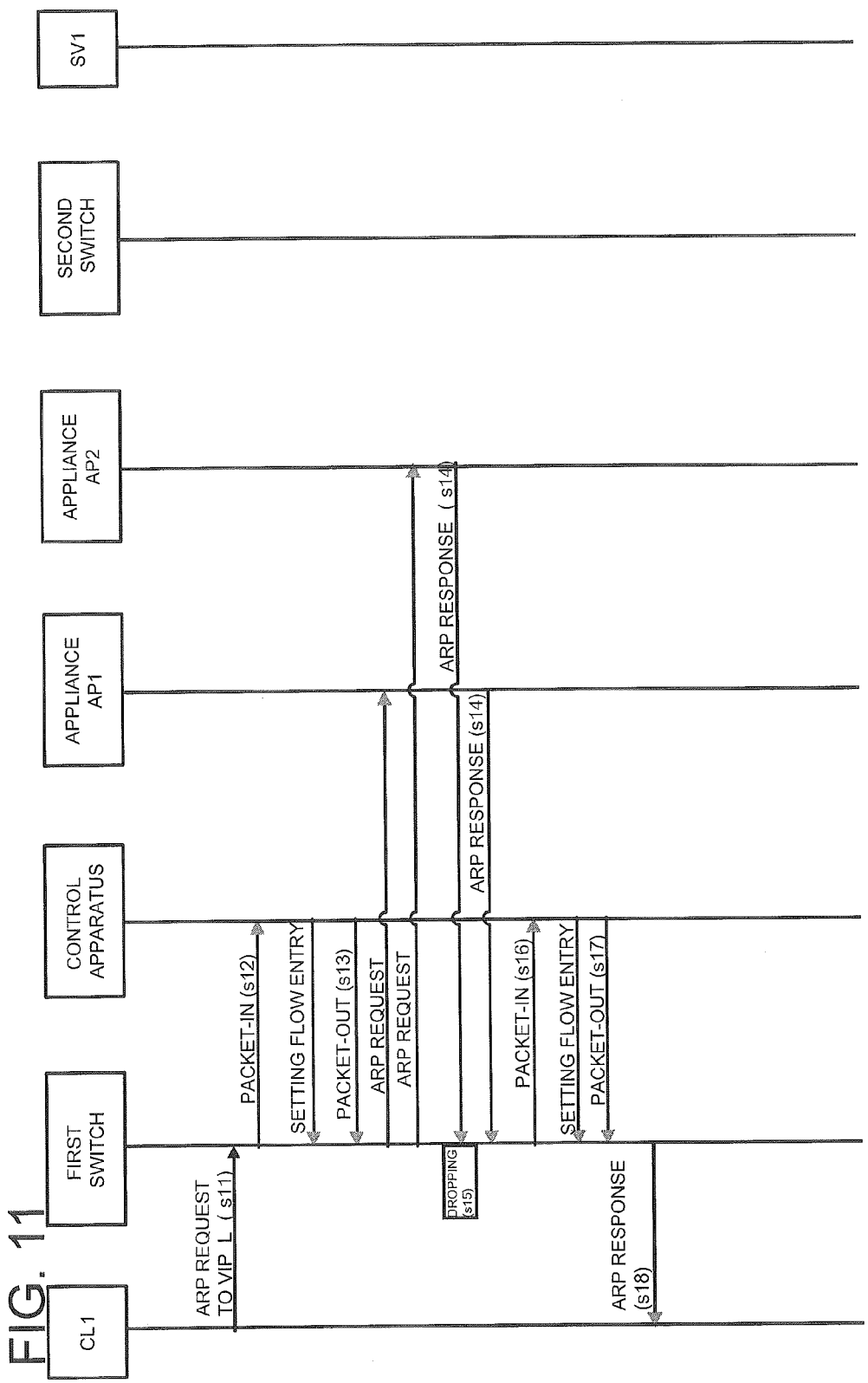
FIG. 11 is a sequence diagram illustrating a series of operations (from transmission of an ARP request by CL1 to reception of an ARP response by CL1) according to the first exemplary embodiment of the present disclosure.

FIGS. 11 to 14 are sequence diagrams illustrating a series of operations according to the first exemplary embodiment of the present disclosure. As illustrated in FIG. 11, the client CL1 starts communication by transmitting an ARP request packet to VIP_L (a virtual IP address on the input side of the appliance) (step s11).

The upstream switch (the first switch 110) searches a flow table in the packet processing unit 130 (which will simply be referred to as a "flow table") for a flow entry having a matching condition(s) that matches the received ARP request packet. In this case, flow entry No. 0 in FIG. 6 matches the ARP request packet. Therefore, in accordance with the corresponding action, the upstream switch (the first switch 110) forwards the ARP packet to the control apparatus 140 (hereinafter, processing for forwarding a packet from a switch to the control apparatus (processing for requesting setting a flow entry) will be referred to as "packet-in") (step s12).

The control apparatus 140 refers to the connection information in the redundancy configuration management table and the header information of the received packet and determines that the received packet is an ARP request with respect to VIP_L of the appliance. Accordingly, the control apparatus 140 sets a flow entry for transmitting the ARP packet to each of the APs 120 and 121 in the upstream switch (the first switch 110). In this case, flow entry No. 100 in FIG. 6 is set. Next, the control apparatus 140 requests and causes the upstream switch (the first switch 110) to transmit the ARP packet to each of the appliances AP 120 and AP 121 via the ports p1 and p2, respectively (hereinafter, this processing will be referred to as "packet-out") (step s13).

Each of the appliances AP 120 and AP 121 receives the ARP packet and transmits an ARP response packet including a MAC address corresponding to VIP_L (step s14).

The upstream switch (the first switch 110) drops the ARP response received from the AP 121 in accordance with flow entry No. 1 in FIG. 6 (step s15).

In contrast, the upstream switch (the first switch 110) transmits the ARP response received from the AP 120 to the control apparatus 140 in accordance with flow entry No. 0 in FIG. 6 (step s16).

The path control unit 141 in the control apparatus 140 determines that the received packet is an ARP response from the appliance and sets a flow entry for outputting the ARP response via a port of the upstream switch (the first switch 110), the port being connected to the destination of the ARP response. In this case, since the destination is the CL1, the ARP response is outputted via the port p0. Thus, flow entry No. 101 in FIG. 6 is set. Accordingly, the control apparatus 140 causes the upstream switch (the first switch 110) to output the packet via the port p0 (step s17). The client CL1 receives the ARP response (step s18).

Figure 12:
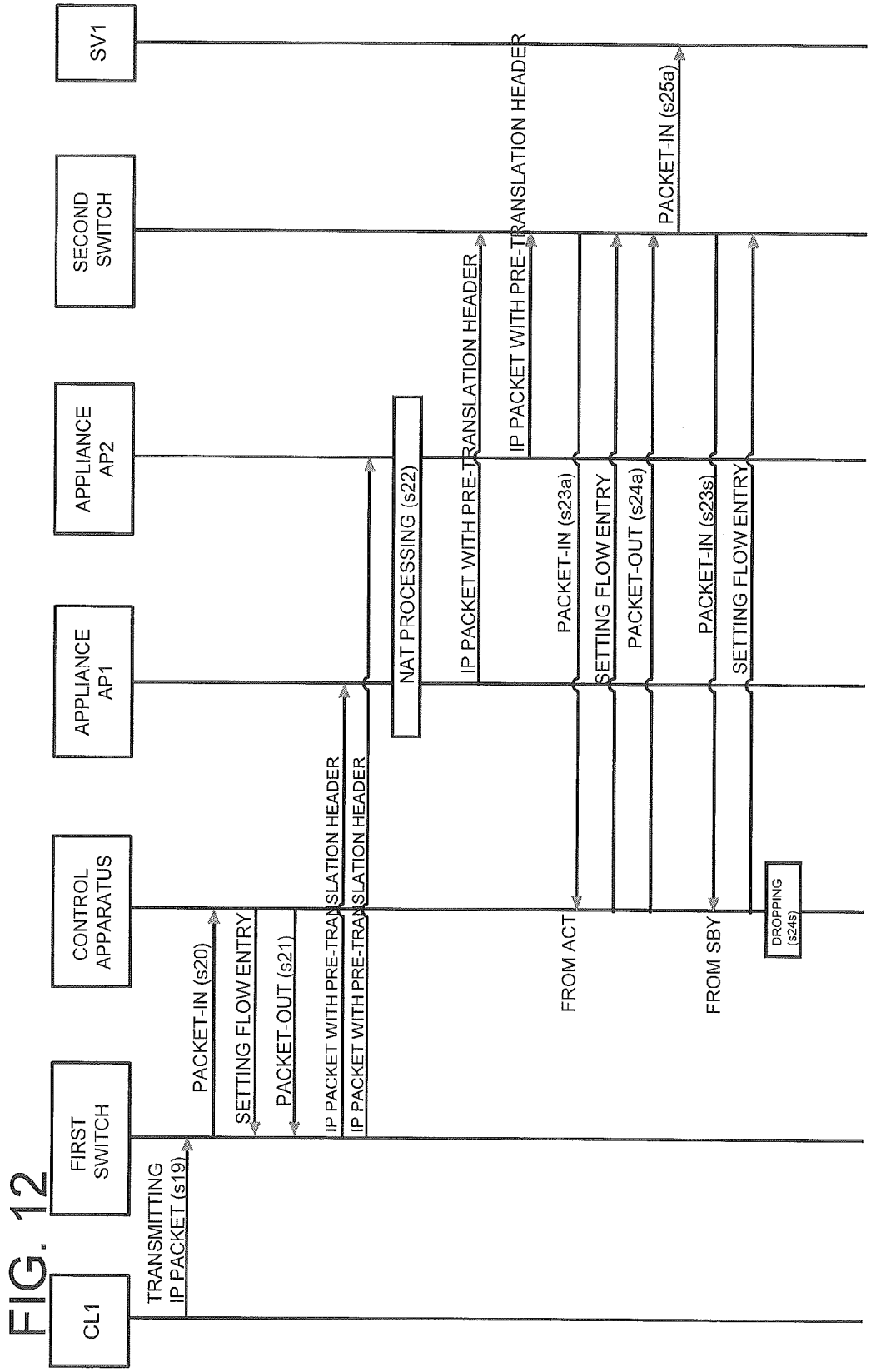
FIG. 12 is a sequence diagram illustrating a series of operations (from transmission of a packet by CL1 to reception of the packet by SV1) according to the first exemplary embodiment of the present disclosure.

As illustrated in FIG. 12, after receiving the ARP response, the client CL1 transmits an IP packet addressed to VIP_L (step s19).

The upstream switch (the first switch 110) transmits the received IP packet to the control apparatus 140 in accordance with flow entry No. 0 (step s20).

The control apparatus 140 determines that the received packet is an IP packet addressed to the appliance. Accordingly, the control apparatus 140 sets a flow entry for adding a pre-translation header, translating the destination MAC address to a MAC address of each of the appliances, and transmitting the packet to each of the APs 120 and 121 in the upstream switch (the first switch 110). Next, the control apparatus 140 causes the upstream switch (the first switch 110) to add a pre-translation header to the packet and output the packet via the ports p1 and p2 (step s21). Since the continuation flag in the redundancy configuration management table is Yes, a flow entry in which processing for adding a pre-translation header is added as an action is set, as in flow entry No. 102 in FIG. 6. In addition, since the continuation flag is Yes, the addition flag in an IP header is not used.

The appliances AP 120 and AP 121 translate the respective received packets in accordance with the respective NAT tables and output the respective translated packets to the downstream switch (the second switch 111) (step s22).

The downstream switch (the second switch 111) searches the flow table in the packet processing unit 131 for a flow entry having a matching condition(s) that matches the received packets. In this case, since flow entry No. 0 in FIG. 7 matches the received packet, the downstream switch (the second switch 111) forwards the received packet to the control apparatus 140 in accordance with the corresponding action (steps s23a and s23s).

The control apparatus 140 refers to the redundancy configuration management table, determines, from ingress port information (inport) of the received packet, whether the downstream switch (second switch 111) receives this packet from the ACT or the SBY, and on the basis of the result of the determination, registers an entry in the header translation table.

If the control apparatus 140 registers an entry in response to the packet received from the ACT, the control apparatus 140 sets a flow entry for outputting subsequent packets via the port p0 in the downstream switch (the second switch 111). In this case, if the continuation flag in the redundancy configuration management table is Yes, the control apparatus 140 adds an action for deleting the pre-translation header, as illustrated in flow entry No. 101 in FIG. 7. Subsequently, the control apparatus 140 performs deletion of the pre-translation header and causes the downstream switch (the second switch 111) to output the packet via the port p0 (step s24a).

In contrast, if the control apparatus 140 registers an entry in the header translation table in response to the received packet from the SBY, the control apparatus 140 sets a flow entry for dropping subsequent packets and drops the received packet (step s24s).

Thus, SV1 receives the packet forwarded via the AP 120 (step s25a).

Figure 13:
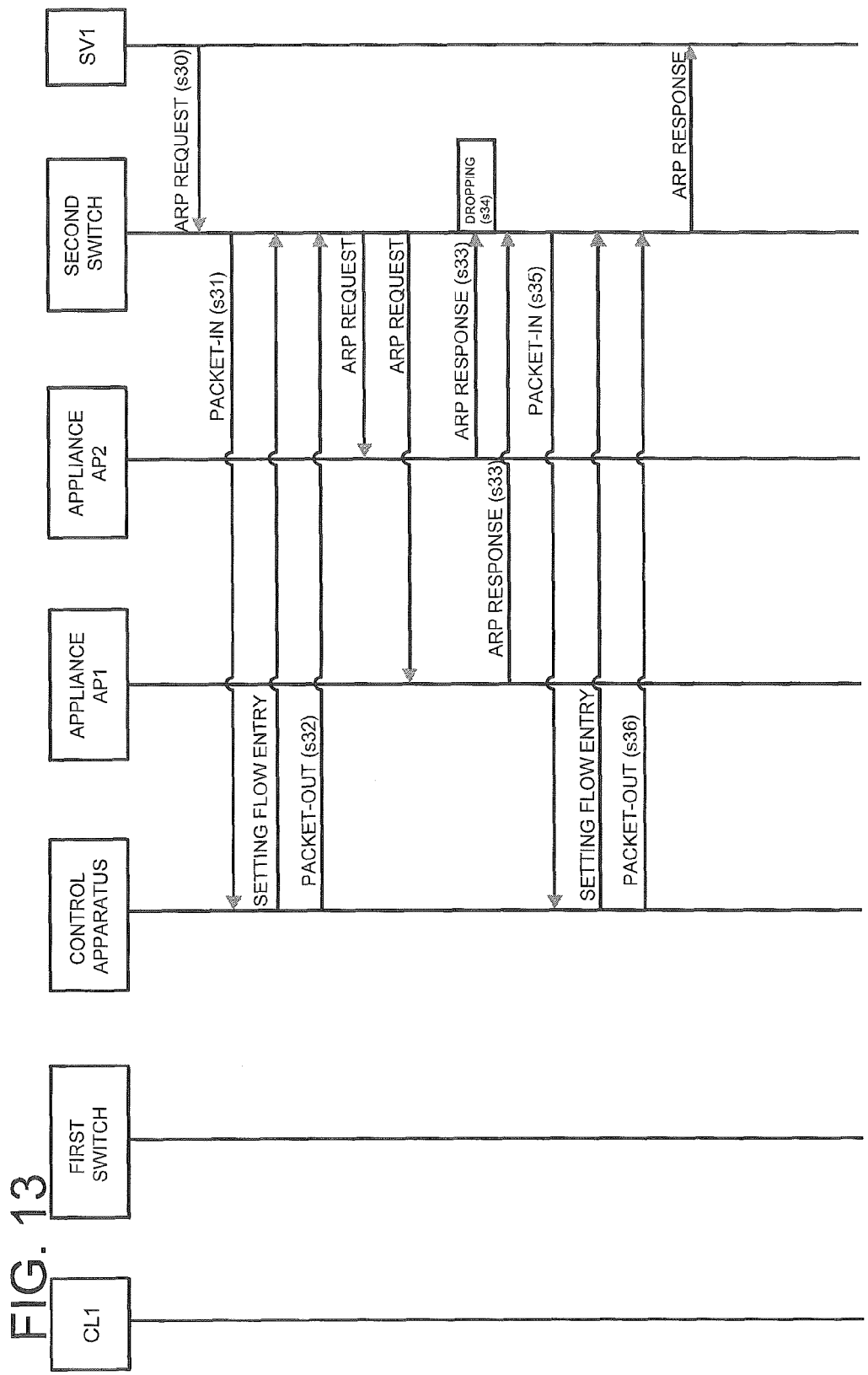
FIG. 13 is a sequence diagram illustrating a series of operations (from transmission of an ARP request by SV1 to reception of an ARP response by SV1) according to the first exemplary embodiment of the present disclosure.

Next, as illustrated in FIG. 13, in order to transmit a response packet to IP_CL1 after receiving the packet, SV1 transmits an ARP request packet to VIP_R, which is a default GW (step s30).

The downstream switch (the second switch 111) searches the flow table in the packet processing unit 131 for a flow entry having a matching condition(s) that matches the received ARP packet. In this case, since flow entry No. 0 in FIG. 7 matches the received ARP packet, the downstream switch (the second switch 111) forwards the ARP packet to the control apparatus 140 in accordance with the corresponding action (step s31).

The control apparatus 140 refers to the connection information in the redundancy configuration management table and the header information of the received packet and determines that the packet is an ARP request with respect to VIP_R of the appliance. Accordingly, the control apparatus 140 sets a flow entry for transmitting the ARP packet to each of the APs 120 and 121 in the downstream switch (the second switch 111). In this case, flow entry No. 102 in FIG. 7 is set. Next, the control apparatus 140 causes the downstream switch (the second switch 111) to transmit the ARP packet to each of the appliances AP 120 and AP 121 via the ports p1 and p2, respectively (step s32).

Each of the appliances AP 120 and AP 121 receives the ARP packet and transmits an ARP response packet including a MAC address corresponding to VIP_R (step s33).

The downstream switch (the second switch 111) drops the ARP response received from the AP 121 in accordance with flow entry No. 1 in FIG. 7 (step s34).

In contrast, the downstream switch (the second switch 111) transmits the ARP response received from the AP 120 to the control apparatus 140 in accordance with flow entry No. 0 in FIG. 7 (step s35).

The path control unit 141 in the control apparatus 140 determines that the received packet is an ARP response from the appliance to SV1 and sets a flow entry for outputting the ARP response via a port of the downstream switch (the second switch 111), the port being connected to the destination of the ARP response. In this case, since the destination is the SV1, the ARP response is outputted via the port p0. Thus, flow entry No. 103 in FIG. 7 is set. Accordingly, the control apparatus 140 causes the downstream switch (the second switch 111) to output the packet via the port p0 (step s36). The SV1 receives the ARP response.

Figure 14:
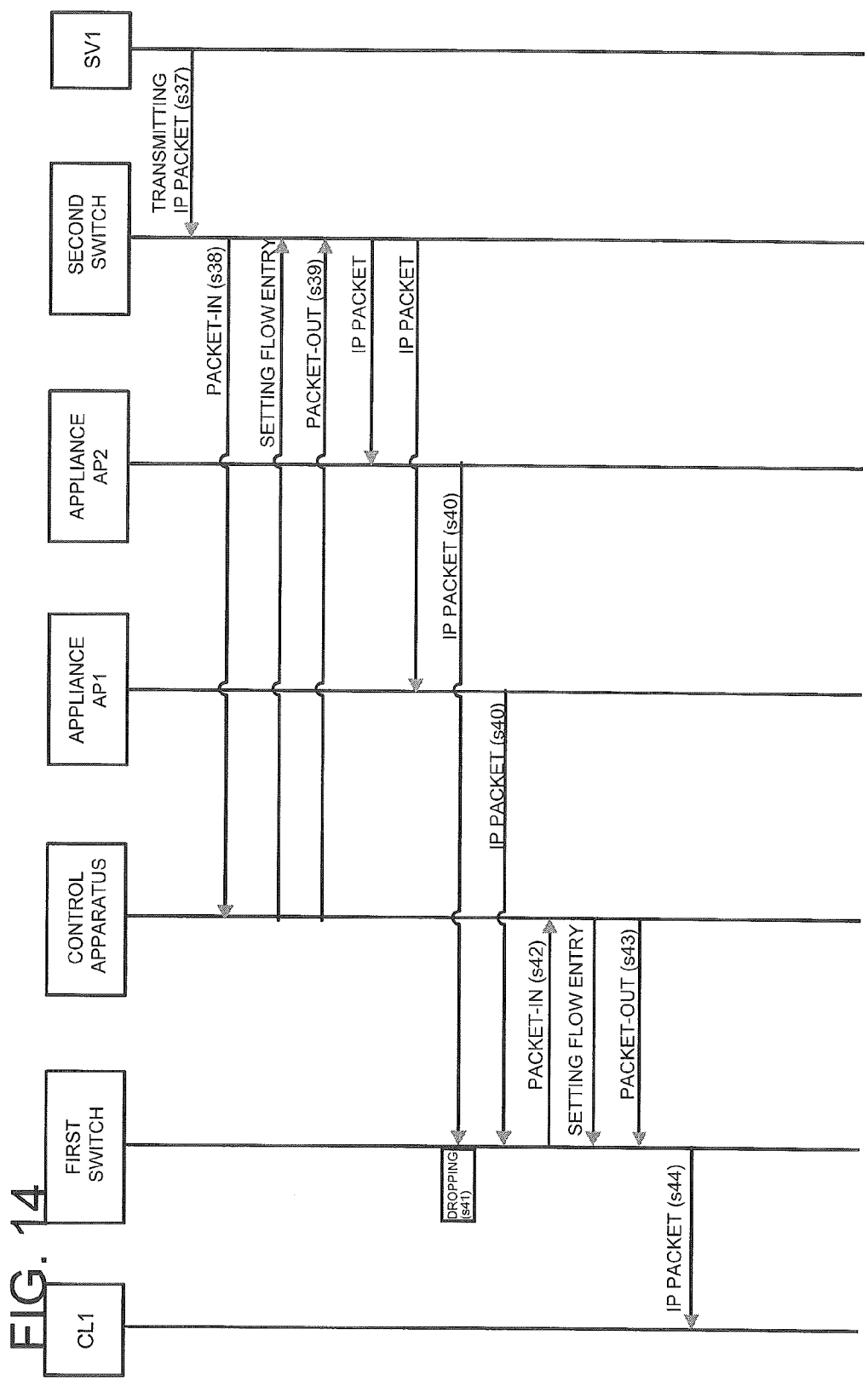
FIG. 14 is a sequence diagram illustrating a series of operations (from transmission of a packet by SV1 to reception of the packet by CL1) according to the first exemplary embodiment of the present disclosure.

As illustrated in FIG. 14, after receiving the ARP response, the SV1 transmits an IP packet addressed to VIP_R (step s37).

The downstream switch (the second switch 111) transmits the received IP packet to the control apparatus 140 in accordance with flow entry No. 0 (step s38).

The control apparatus 140 determines that the received packet is an IP packet addressed to the CL1 and sets a flow entry for translating the IP packet and transmitting the translated IP packet to the AP 120 and the AP 121 in the downstream switch (the second switch 111). More specifically, the destination MAC address (dl_dst) is translated so that the IP packet is transmitted to the AP 120 and the destination MAC address (dl_dst), the source MAC address (dl_src), and the source IP address (nw_src) are translated so that the IP packet is transmitted to the AP 121. In this case, flow entry No. 104 in FIG. 7 is set. Next, the control apparatus 140 causes the downstream switch (the second switch 111) to perform the corresponding processing on the received packet and output the packet via each of the ports p1 and p2 (step s39). The reason why such translation is performed when the IP packet is transmitted to the AP 121 is that the AP 121 needs to recognize that the packet is a response packet from the SV2 with which the AP 121 has communicated. These items of information can be acquired from the path control unit 141.

The appliances AP 120 and AP 121 receive the respective IP packets, translate the respective packet headers in accordance with the respective NAT tables, and output the translated IP packets to the upstream switch (the first switch 110) (step s40).

The upstream switch (the first switch 110) searches the flow table in the packet processing unit 131 for a flow entry having a matching condition(s) that matches the received packet. The upstream switch (the first switch 110) drops the packet from the AP 121 in accordance with flow entry No. 1 in FIG. 6 (step s41).

In contrast, the upstream switch (the first switch 110) forwards the packet from the AP 120 to the control apparatus 140 in accordance with the flow entry No. 0 in FIG. 6 (step s42).

The control apparatus 140 determines that the received packet is a response packet from the AP 120 and sets a flow entry for outputting the packet via the output port p0 in the upstream switch (the first switch 110). In this case, flow entry No. 103 in FIG. 6 is set. The control apparatus 140 instructs the upstream switch (the first switch 110) to output the packet (step s43).

Thus, the CL1 receives the response packet forwarded via the AP 120 (step s44).

[Updating NAT Table]

Figure 15:
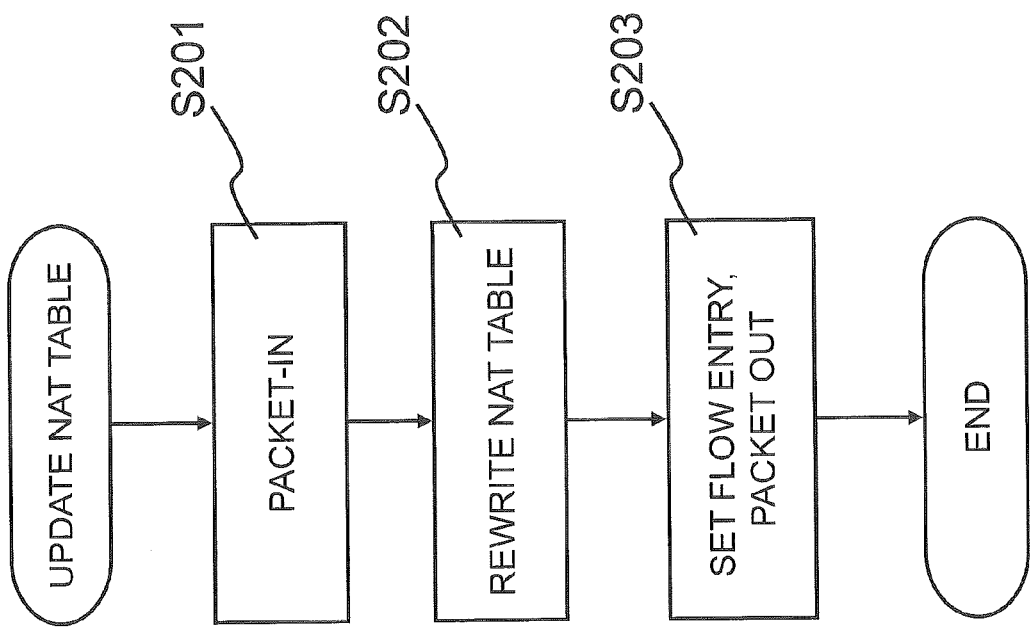
FIG. 15 is a flowchart illustrating an operation (NAT table translation) according to the first exemplary embodiment of the present disclosure.

Next, processing performed when a NAT table is updated in at least one of the appliances AP 120 and AP 121 will be described. FIG. 15 is a flowchart illustrating an operation (NAT table translation) according to the first exemplary embodiment of the present disclosure.

If a NAT table is updated, packet headers that have passed through the appliances are captured by flow entry No. 0 in the upstream switch (the first switch 110) or the downstream switch (the second switch 111) and are transmitted to the control apparatus 140.

The following example assumes that a packet is transmitted from the CL1 to VIP_L, a NAT table in the AP 120 in system 1 operating as the ACT is updated, and nw_dst is translated from IP_SV1 to IP_SV3.

In this case, when receiving the packet whose header information is translated in accordance with information in the new NAT table, the downstream switch (the second switch 111) transmits the packet to the control apparatus 140 in accordance with flow entry No. 0 (step S201).

The control apparatus 140 refers to the redundancy configuration management table and determines via which appliance the received packet has been outputted. In this example, since the SWID of the downstream switch (the second switch 111) is sw2 and the ingress port information (inport) is p1, the entry in which the CLID is 1 in the redundancy configuration management table is matched. In addition, key field information in this entry is nw_src and the value in the nw_src field in the received packet header is IP_CL1. Thus, the control apparatus 140 determines that entry No. 1 in the header translation table is matched. Next, the control apparatus 140 rewrites nw_src in the post-translation header information in system 1 in No. 1 in the header translation table to IP_SV3, which is acquired from the received packet header (step S202). If the packet is transmitted in the reverse direction, nw_dst, which is the counterpart of nw_src, is used as the key information. In addition, since the continuation flag is Yes, an entry in the header translation table may be determined by using a pre-translation header.

Next, the control apparatus 140 rewrites flow entries in the downstream switch (the second switch 111) on the basis of the information used before and after the rewrite of the post-translation header in system 1. First, nw_dst as a matching condition in the flow entry No. 101 in FIG. 7 is rewritten from IP_SV1 to IP_SV3 and nw_src as a matching condition in the flow entry No. 104 in FIG. 7 is rewritten from IP_SV1 to IP_SV3. Next, the control apparatus 140 causes the downstream switch (the second switch 111) to output the packet via the port p0 (step S203).

While the above example assumes that the packet is transmitted from the CL1 to the SV1 and the appliance type is Half-NAT, this is merely an example. Thus, the present disclosure is not limited to such example.

[Switching Systems]

Next, an operation performed when the ACT and the SBY are switched between the AP 120 and the AP 121 will be described. If a failure occurs in the AP 120 forming the redundant configuration with the AP 121, the control apparatus 140 receives a notification of the failure. The control apparatus 140 may be notified of such information by receiving an SNMP (Simple Network Management Protocol) Trap or information from an appliance. Further alternatively, packets passing through an appliance may be monitored or life may be monitored by a heartbeat. However, the method for receiving such notification is not limited to these methods.

When notified of a failure, the control apparatus 140 refers to the redundancy configuration management table, refers to an entry in which the CLID is 1, switches the current ACT (active system) to system 2, and acquires information about a connection port in system 1 and nw_src as the key field. Next, the control apparatus 140 refers to the header translation table and acquires a list of nw_src in which the CLID is 1 and the active system field is system 1. In this example, the control apparatus 140 acquires entry No. 1 in the header translation table. FIG. 16 illustrates the redundancy configuration management table updated as described above. The modified portion is indicated by a dashed line.

Next, the control apparatus 140 rewrites the relevant flow entries in the downstream switch (the second switch 111) on the basis of the acquired nw_src (IP_CL1 in this case). More specifically, of the flow entries set in the downstream switch (the second switch 111), the control apparatus 140 determines the flow entries No. 100 and No. 101 in which nw_src as a matching condition is IP_CL1 (see FIG. 7). Next, the control apparatus 140 changes the action in flow entry No. 100 to "rewrite dl_dst=MAC_SV1, rewrite nw_dst=IP_SV1, and output p0". In addition, the control apparatus 140 changes the actions in the flow entry No. 101 to "drop".

Next, regarding flow entry No. 1 for dropping ARP packets received via the connection port p2 in system 2 operating as the SBY in the previous setting, the control apparatus 140 changes the ingress port information (inport) as a matching condition to the connection port 1 of the new SBY. In addition, regarding flow entry No. 103, the control apparatus 140 changes the ingress port information (inport) as a matching condition to the connection port p2 of the new ACT. As a result, the downstream switch (the second switch 111) forwards communication packets received from the AP 121 operating as the new ACT (while performing packet header translation) and drops communication packets received from the AP 120, which is the previous ACT. FIG. 18 illustrates flow entries set in the downstream switch (the second switch 111) after the above update. The modified portions are indicated by dashed lines.

Next, the control apparatus 140 rewrites relevant flow entries set in the upstream switch (the first switch 110) (see FIG. 7). More specifically, regarding flow entry No. 101 for forwarding ARP packets received via the connection port 1 in system 1 operating as the ACT in the previous setting, the control apparatus 140 changes the ingress port information (inport) as a matching condition to the connection port p2 of the new ACT. Next, regarding flow entry No. 1 for dropping ARP packets received via the connection port p2 in system 2 operating as the SBY in the previous setting, the control apparatus 140 changes the ingress port information (inport) as a matching condition to the connection port p1 of the new SBY. In addition, regarding flow entry No. 103 for forwarding response packets from the previous ACT to the CL1, the control apparatus 140 changes the ingress port information (inport) as a matching condition to the port p2. FIG. 17 illustrates flow entries set in the upstream switch (the first switch 110) after the above update. The modified portions are indicated by dashed lines.

As a result, the upstream switch (the first switch 110) forwards communication packets from the AP 121 operating as the new ACT (while performing packet header translation) and drops communication packets from the AP 120, which is the previous ACT.

If the systems need to be switched back again, it is only necessary to perform the above procedures reversely.

Thus, according to the present exemplary embodiment, the difference in header translation between the AP 120 system and the AP 121 system is absorbed by the downstream switch (the second switch 111). As a result, even if the ACT and SBY appliances are different models, a stateful failover can be realized. As described in the present exemplary embodiment, by arranging a redundant appliance between the upstream switch (the first switch 110) and the downstream switch (the second switch 111), a stateful failover between different models of appliances can be realized. Thus, the freedom in selecting and arranging appliances is increased and the flexibility in allocating physical resources is improved.

While an exemplary embodiment of the present invention has thus been described, the present invention is not limited thereto. Further variations, substitutions, or adjustments can be made without departing from the basic technical concept of the present invention. For example, in the above exemplary embodiment, the client CL1 is connected to the upstream switch (the first switch 110) and the servers SV1 to SV3 are connected to the downstream switch (the second switch 111) via the switch 112. However, this configuration is merely an example to facilitate understanding of the present invention, not to limit the present invention to the illustrated modes.

The disclosure of the above PTLs and NPLs is incorporated herein by reference thereto. Modifications and adjustments of the exemplary embodiment(s) and examples are possible within the scope of the overall disclosure (including the claims) of the present invention and based on the basic technical concept of the present invention. Various combinations and selections of various disclosed elements (including the elements in each of the claims, exemplary embodiment(s), examples, drawings, etc.) are possible within the scope of the claims of the present invention. Namely, the present invention of course includes various variations and modifications that could be made by those skilled in the art according to the overall disclosure including the claims and the technical concept.

In Japanese, a noun can represent the singularity and plurality. Therefore, a term in singular form also represents the plurality.

REFERENCE SIGNS LIST 20, 21 network appliance
30 first switch
31 second switch
40 control apparatus
110 first switch
111 second switch
112 switch
120, 121 appliance (AP)
130, 131 packet processing unit
140 control apparatus
141 path control unit
142 translation rule management unit
p0, p1, p2 port
CL1 client
SV1 to SV3 server

What is claimed is:

1. A network appliance redundancy system, comprising:
    a first switch arranged upstream of two different models of network appliances each of which switchably operates in an active system and a standby system;
    a second switch arranged downstream of the two different models of network appliances; and
    a control apparatus comprising a translation rule management unit learning a header translation rule(s) of a network appliance operating in the active system on the basis of header information of a packet transmitted from the first switch and header information of a packet received by the second switch via the network appliance operating in the active system and instructing, when the appliances in the active and standby systems are switched, the second switch to rewrite header information on the basis of the header translation rule(s) so as to obtain the same output packet as that from the network appliance operating in the active system.

2. The network appliance redundancy system according to claim 1;
    wherein each of the first and second switches comprises:
    a control information storage unit storing control information in which a matching condition(s) that is matched against a received packet and a processing content(s) are associated with each other; and
    a packet processing unit performing a corresponding processing content(s) defined in control information having a matching condition(s) that matches a received packet, among the control information stored in the control information storage unit; and
    wherein the control apparatus receives header information of a packet transmitted from the first switch and header information of a packet received by the second switch by rewriting control information stored in the control information storage units in the first and second switches.

3. The network appliance redundancy system according to claim 2;
    wherein the control apparatus learns a header translation rule(s) of a network appliance operating in the active system by setting control information for transmitting a packet that can store header information that is obtained before and after translation by the network appliance operating in the active system in the first switch and by setting control information for forwarding a packet having header information rewritten by the network appliance operating in the active system in the second switch.

4. The network appliance redundancy system according to claim 3;
    wherein the control apparatus instructs the first and second switches to rewrite header information by using the control information.

5. The network appliance redundancy system according to claim 3;
    wherein the control apparatus detects whether an address translation table has been updated on the basis of a notification from the second switch, updates a header translation rule(s) stores in the translation rule management unit, and instructs the second switch to rewrite a header(s) so as to obtain the same output packet as that from the network appliance operating in the active system.

6. The network appliance redundancy system according to claim 3;
    wherein the network appliance(s) comprises a NAT apparatus, a NAPT apparatus, or a load balancer.

7. The network appliance redundancy system according to claim 2;
    wherein the control apparatus instructs the first and second switches to rewrite header information by using the control information.

8. The network appliance redundancy system according to claim 7;
    wherein the control apparatus detects whether an address translation table has been updated on the basis of a notification from the second switch, updates a header translation rule(s) stored in the translation rule management unit, and instructs the second switch to rewrite a header(s) so as to obtain the same output packet as that from the network appliance operating in the active system.

9. The network appliance redundancy system according to claim 7;
    wherein the network appliance(s) comprises a NAT apparatus, a NAPT apparatus, or a load balancer.

10. The network appliance redundancy system according to claim 2;
    wherein the control apparatus detects whether an address translation table has been updated on the basis of a notification from the second switch, updates a header translation rule(s) stored in the translation rule management unit, and instructs the second switch to rewrite a header(s) so as to obtain the same output packet as that from the network appliance operating in the active system.

11. The network appliance redundancy system according to claim 2;
    wherein the network appliance(s) comprises a NAT apparatus, a NAPT apparatus, or a load balancer.

12. The network appliance redundancy system according to claim 1;
    wherein the control apparatus detects whether an address translation table has been updated on the basis of a notification from the second switch, updates a header translation rule(s) stored in the translation rule management unit, and instructs the second switch to rewrite a header(s) so as to obtain the same output packet as that from the network appliance operating in the active system.

13. The network appliance redundancy system according to claim 12;
    wherein the network appliance(s) comprises a NAT apparatus, a NAPT apparatus, or a load balancer.

14. The network appliance redundancy system according to claim 1;
    wherein the network appliance(s) comprises a NAT apparatus, a NAPT apparatus, or a load balancer.

15. A control apparatus:
    connected to a first switch arranged upstream of two different models of network appliances each of which switchably operates in an active system and a standby system and to a second switch arranged downstream of the two different models of network appliances;
    comprising a translation rule management unit learning a header translation rule(s) of a network appliance operating in the active system on the basis of a packet transmitted from the first switch and a packet received by the second switch via the network appliance operating in the active system; and
    instructing, when the appliances in the active and standby systems are switched, the second switch to rewrite header information on the basis of the header translation rule(s) so as to obtain the same output packet as that from the network appliance operating in the active system.

16. A network appliance redundancy method, comprising:
causing a control apparatus, connected to a first switch arranged upstream of two different models of network appliances each of which switchably operates in an active system and a standby system and to a second switch arranged downstream of the two different models of network appliances, to learn a header translation rule(s) of a network appliance operating in the active system on the basis of header information of a packet transmitted from the first switch and header information of a packet received by the second switch via the network appliance operating in the active system; and
causing the control apparatus to instruct, when the appliances in the active and standby systems are switched, the second switch to rewrite header information similarly to the first switch on the basis of the header translation rule(s).

17. A non-transient computer-readable storage medium storing a program, causing a computer, which is mounted on a control apparatus connected to a first switch arranged upstream of two different models of network appliances each of which switchably operates in an active system and a standby system and to a second switch arranged downstream of the two different models of network appliances, to perform processing for:
  learning a header translation rule(s) of a network appliance operating in the active system on the basis of header information of a packet transmitted from the first switch and header information of a packet received by the second switch via the network appliance operating in the active system; and
  instructing, when the appliances in the active and standby systems are switched, the second switch to rewrite header information similarly to the first switch on the basis of the header translation rule(s).

* * * * *